US012320494B2

(12) United States Patent
Hierzer

(10) Patent No.: US 12,320,494 B2
(45) Date of Patent: Jun. 3, 2025

(54) TRACK PROFILE FOR A PROFILE LIGHT OR FOR A TRACK LIGHTING SYSTEM

(71) Applicant: H4X e.U., Graz (AT)

(72) Inventor: Andreas Hierzer, Graz (AT)

(73) Assignee: H4X e.U., Graz (AT)

( * ) Notice: Subject to any disclaimer, the term of this patent is extended or adjusted under 35 U.S.C. 154(b) by 0 days.

(21) Appl. No.: 18/141,082

(22) Filed: Apr. 28, 2023

(65) Prior Publication Data

US 2023/0349522 A1 Nov. 2, 2023

(30) Foreign Application Priority Data

Apr. 29, 2022 (DE) ......................... 102022204266.2

(51) Int. Cl.
*F21S 8/06* (2006.01)
*F21V 21/005* (2006.01)

(52) U.S. Cl.
CPC ............ *F21S 8/066* (2013.01); *F21V 21/005* (2013.01)

(58) Field of Classification Search
CPC .. F21S 8/066; F21V 21/008; F21V 21/34–35; F21V 23/06; H01R 13/506; H01R 24/14–168
See application file for complete search history.

(56) References Cited

U.S. PATENT DOCUMENTS 3,910,667 A 10/1975 Heritage

FOREIGN PATENT DOCUMENTS

| | | | |
|---|---|---|---|
| DE | 102008036474 | A1 | 2/2010 |
| DE | 202010007710 | U1 | 9/2010 |
| DE | 202019105625 | U1 | 1/2021 |
| DE | 102019126955 | A1 | 4/2021 |
| DE | 102020108013 | A1 | 9/2021 |
| EP | 1933434 | A1 | 6/2008 |
| EP | 2113716 | A1 | 11/2009 |

OTHER PUBLICATIONS

Search report in corresponding EP 23169088 dated Sep. 14, 2023 (pp. 1-2).
Office Action in corresponding DE application 10 2022 204 266.2 dated Jan. 13, 2023 (pp. 1-7).
Austria Office Action dated Jun. 25, 2024 issued in corresponding A 50314/2022 application (3 pages).

*Primary Examiner* — Jason M Han
(74) *Attorney, Agent, or Firm* — Christopher B. Kilner; MILLEN, WHITE, ZELANO & BRANIGAN

(57) ABSTRACT

The invention relates to a track profile (1) for a profile light or a track lighting system. The track profile has an outer base profile component (2) with an inner area (3) and at least one inner profile component (4; 4'). The outer base profile component and the inner profile component can be produced separately. Furthermore, the outer base profile component and the inner profile component are designed in such a way that, to assemble the track profile, the inner profile component can be loosely inserted into the inner area and the inner profile component, arranged loosely in the inner area along a longitudinal extension (5) of the outer base profile component, can then be latched to the outer base profile component in order to mechanically connect the outer base profile component and the inner profile component to one another.

20 Claims, 3 Drawing Sheets

TRACK PROFILE FOR A PROFILE LIGHT OR FOR A TRACK LIGHTING SYSTEM

FIELD OF THE INVENTION

The invention relates to the field of lighting arrangements, in particular for lighting purposes in buildings, for example in interiors. The invention relates in particular to the field of profile lights and/or track lighting systems and relates to a track profile for a light or a system of this type.

TECHNICAL BACKGROUND

Profile lights and lighting systems with track profiles are already known.

For example, DE 10 2015 112 838 A1 describes a busbar with an essentially U-shaped profile that is open at the bottom and in which power lines run in the longitudinal direction.

Such a conventional track profile includes a track which is extruded, for example, from metal such as aluminium, in the interior of which plastic insulating profiles with receptacles for conductors are held.

Conventional insulating inner profile components, which can, for example, be arranged on both sides in the outer track and can, for example, hold current conductors or conductors for control signals, are usually integrated into the outer profiles by means of complex processes that require their own expensive tools. For example, they can be integrated when producing the track profile through special pressing processes using specially provided tools. Alternatively, conventional inner profile components can be pushed into an outer profile from one end. In the case of the latter procedure, the tolerance for error is low, especially in the case of longer profiles, as even small deviations, for example geometry and dimension deviations, can cause the inner profiles to become stuck during insertion. The production of conventional track profiles is therefore undesirably expensive and cumbersome.

SUMMARY OF THE INVENTION

Against this background, the invention is based on the object of proposing a track profile that can be constructed in a simpler, more cost-effective manner.

According to the invention, this object is achieved by a track profile with the features of claim 1.

Accordingly, a track profile for a profile light or for a track lighting system is proposed, wherein the track profile has an outer base profile component with an inner area and at least one inner profile component.

The outer base profile component and the inner profile component can be produced separately. Furthermore, the outer base profile component and the inner profile component are designed in such a way that, to assemble the track profile, the inner profile component can be loosely inserted into the inner area and the inner profile component arranged loosely in the inner area along a longitudinal extension of the outer base profile component can then be latched to the outer base profile component in order to mechanically connect the outer base profile component and the inner profile components to each other.

One idea of the invention is therefore to create a modular track profile and divide the track profile into several components that can be manufactured separately and then be connected easily and inexpensively by latching, including the outer base profile component and one or more inner profile component(s) that can be snapped into the outer base profile component.

In the case of the invention, the track profile can thus be assembled in a particularly simple manner. The outer base profile component and inner profile component are initially manufactured separately. To assemble the track profile, the inner profile component is inserted loosely into the inner area of the outer base profile component and is loosely arranged in the inner area along the longitudinal extension of the outer base profile component. The inner profile component loosely arranged in this way in the inner area is then latched to the outer base profile component. The outer base profile component is thereby mechanically connected to the inner profile component. It is thus possible, for example, to avoid pushing an inner profile component from an end face of an outer profile component into the latter with an exertion of force when the contact surfaces rub against one another. Strict requirements with regard to tolerances, such as those conventionally required in order to prevent the inner component from jamming and getting stuck in the outer component when it is pushed in, can thereby be avoided, at least in part.

The manufacture of the track profile as proposed by the invention is thus simpler and cheaper than is possible in the conventional case, and difficulties during assembly due to sticking or jamming of the components are avoided.

Advantageous embodiments and developments of the invention are described in the further dependent claims and the description, with reference to the figures in the drawing.

In one embodiment, the outer base profile component and the inner profile component each have a cross section that is essentially constant along a longitudinal direction of the outer base profile component or the inner profile component. Such outer and inner profile components can be produced in a simple and expedient manner.

In one embodiment, the outer base profile component is made using extrusion. Extruded profile components can be produced economically in a simple and expedient manner.

Furthermore, in one embodiment, the inner profile component can be produced using an extrusion process. However, other methods of manufacturing the inner profile component are conceivable.

In one embodiment, the track profile is designed in the assembled state to accommodate an adapter of the profile light or the track lighting system, in particular an adapter that can be coupled or is coupled to a lighting device or a lighting module.

Such a track profile can be used favourably for the construction of a lighting system that can be used flexibly. Alternatively or additionally, it is conceivable that a lighting module can be accommodated in the track profile.

In a development, the inner profile component is designed to accommodate conductors, or conductors are provided in or on the inner profile component. In this case, the conductors are designed to provide electrical current for the operation of at least one lighting device or at least one lighting module and/or to provide a control signal. In particular, the current and/or the control signal can be tapped off the conductors by means of the adapter, preferably at a freely selectable point along the track profile.

In one embodiment, the track profile has at least two inner profile components. In this way, a plurality of conductors can favourably be accommodated, whereby for example two or more of the conductors can be used for one or more control signal(s) and further conductors can be used for the provision of e.g. one or more phases of alternating electrical current and as a neutral conductor.

In one embodiment, the two inner profile components are designed with the same geometry, in particular they can be produced using the same tool, for example the same extrusion tool. In one embodiment, the two inner profile components are connected in a latching manner with the outer base profile component in such a way that the inner profile components are mirror-symmetrical to each other. In this way, it is possible to simplify the structure of the track profile further by arranging and connecting geometrically identical inner profile components on the outer base profile component and/or using symmetrical inner profile components.

In a further embodiment, the two inner profile components are arranged on different sides of a longitudinal central plane of the outer base profile component. This can make it simpler to connect a large number of conductors, for example.

According to one embodiment, the outer base profile component is designed with a U-like basic shape and has a receiving area on both sides of a longitudinal central plane of the outer base profile component, whereby each receiving area is able to receive one of the inner profile components. This can make it easier, for example, to tap into the electrical supply voltage and/or the control signal, for example through contact elements on both sides of an adapter.

In a further embodiment, the inner profile component and the outer base profile component are designed to be locked together relative to the outer base profile component by means of a pivoting movement of the inner profile component arranged loosely along the longitudinal extension of the outer base profile component in the inner area. Such pivoting can further simplify the manufacture of the track profile, prevent larger surface sections of profile components from sliding over one another and prevent undesired jamming.

In one embodiment, the pivoting movement of the inner profile component relative to the outer base profile component can be brought about manually by an operator or alternatively by means of a device designed for this purpose. Manual pivoting and latching is easy and can be advantageous, for example, if relatively small quantities are to be produced. On the other hand, a device can be useful, for example, in the case of long pieces of the track profile and/or the production of large quantities.

In a further development, the inner profile component has a first section, in particular a longitudinal rib-like section, which can be inserted behind a first undercut or behind a first, in particular rounded, inner edge of the outer base profile component in a direction transverse to the longitudinal extension of the outer base profile component. An instantaneous pivot axis for the inner profile component relative to the outer base profile component can thereby be defined in a simple manner. For example, the first section can ride or roll over sections of the base profile component on the rounded inner edge with only limited sliding movement.

In particular, the inner profile component can be locked to the outer base profile component by pivoting the inner profile component around the first section. This enables the inner profile component to be fixed to the outer base profile component in a simple and yet defined manner.

In one embodiment, the inner profile component has a movable, in particular elastically movable, latching device which is provided on a second, in particular longitudinally rib-like, section of the inner profile component and can be brought into latching engagement with a second undercut or a second inner edge of the outer base profile component. The inner profile component can thus be securely and reliably latched to the outer base profile component.

In particular, the latching device can be formed in one piece with a body of the inner profile component or can be embodied with at least one additional component arranged on the body. A design formed in one piece with the body of the inner profile component can further simplify its manufacture, while a design with an additional component can allow for further increased flexibility of the design and material used for the latching device, if desired.

In one embodiment, the inner profile component, seen in a cross-section, has a central area which is designed to accommodate further parts or components, in particular electrical conductors, or is equipped with such parts or components and/or is intended for mechanical coupling with an adapter or module which can be inserted into the track profile. Furthermore, in this embodiment it is provided that the first and second sections are designed adjacent to opposite ends of the central area in the cross section. The inner profile component is thus advantageously divided into several sections which are differentiated according to their function and which can each be appropriately adapted to their function. For example, the central area can be designed with receiving means for the further parts or components and/or can be designed with an engagement geometry for mechanical coupling to the adapter or module. On the other hand, the first and second sections also can be set up for mechanical interaction with the outer base profile component. For example, it is also conceivable to provide inner profile components with different central areas, i.e. inner profile components of different types, which can be designed identically with respect to the first and second sections, which form a mechanical interface to the outer base profile component. This simplifies the production of different track profiles for different purposes.

In one embodiment, the second section is embodied with a slide ramp, which is arranged on the second section, facing away from the central area and the first section. It is thus possible, for example, for the inner profile component to be advantageously supported on the outer base profile component during pivoting, while force is applied in the pivoting direction in the area of the second section. This enables simple latching to occur.

In one embodiment, the first and second sections are designed as longitudinal ribs on the inner profile component that extend transversely to one another, in particular essentially perpendicular to one another. This can help to enable the loose insertion of the inner profile component and its connection behind the first inner edge or the first undercut by means of the first section in a particularly simple manner and in one step. Longitudinal ribs are easy to produce, for example by means of extrusion.

In one embodiment, the outer base profile component is formed from a metal material, in particular aluminium or an aluminium alloy. For example, the outer base profile component can be produced as an outer base profile element which is in particular formed in one piece, preferably by means of extrusion. Such a base profile component is stable.

In one embodiment, the inner profile component can be formed as a body in one piece.

In one embodiment, the inner profile component is formed with a plastic material in at least some areas. In particular, the inner profile component can be manufactured as a single body using plastic, such as by extrusion, for example as an inner profile element.

In particular, the latching device, which enables the inner profile component to be latched to the outer base profile component, can be formed in one piece with the body of the inner profile component.

In further embodiments, it is conceivable that the inner profile component could be embodied in such a way that at least one of several components of the inner profile component accommodates the conductors or is provided with the conductors and in this case the latching device, which enables the inner profile component to latch with the outer base profile component, is furthermore embodied with at least one additional one component.

In a development, it is provided that in the assembled state of the track profile, at least one rectangular free space with a side length, in particular a width, of between approximately 10 millimetres and approximately 20 millimetres, preferably between approximately 14 millimetres and approximately 16 millimetres, is formed in a cross-section thereof. A slim adapter can be elegantly accommodated in such a free space, which can preferably be provided between two inner profile components, for example.

The embodiments and updated versions described above can be combined in any way where appropriate. Further possible embodiments, updated versions and implementations of the invention also include combinations of features of the invention described above or below with regard to the exemplary embodiments which are not explicitly mentioned. In particular, the person skilled in the art will also add individual aspects to the respective basic form of this invention as improvements or additions.

BRIEF DESCRIPTION OF THE DRAWINGS

The invention is explained in more detail below with reference to the exemplary embodiments shown in the figures of the drawings. The following are depicted.

Figure 1:
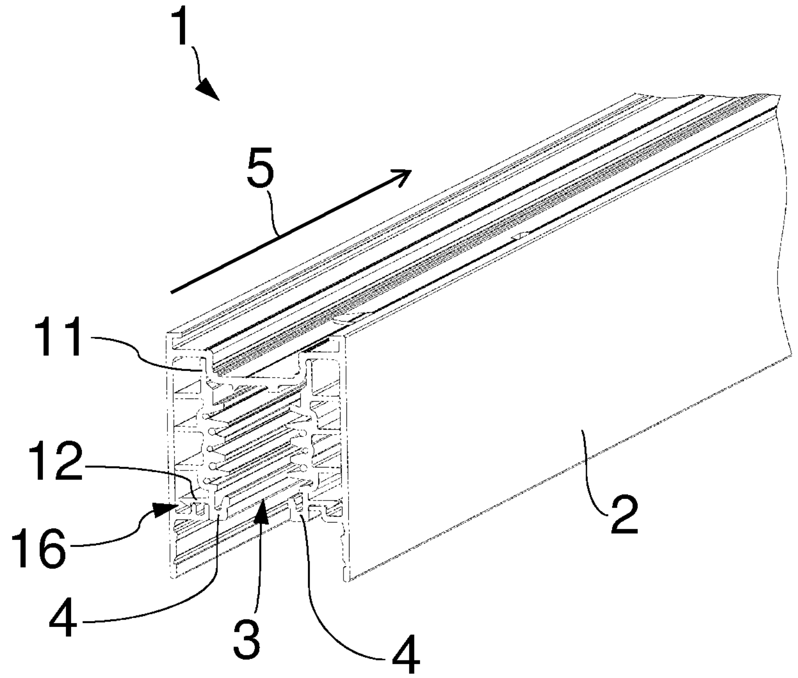
FIG. 1 a perspective view of a short section of a long track profile according to an exemplary embodiment of the invention.
Figure 2:
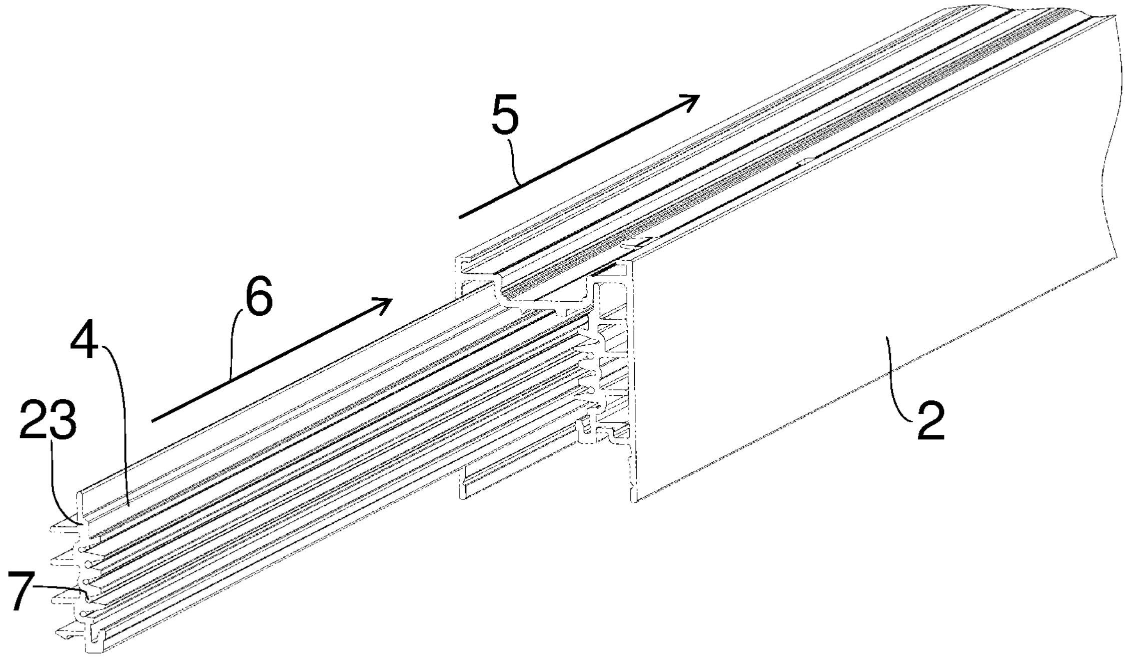
FIG. 2 a perspective view of a track profile according to FIG. 1, wherein a section of an inner profile component is shown extending beyond a section of an outer base profile component to illustrate the configuration of the inner profile component.

The accompanying drawings are provided to clarify the embodiments of the invention. They illustrate the embodiments and, together with the description, serve to explain the principles and concepts of the invention. Other embodiments and many of the mentioned advantages will become apparent when consulting the drawings. The elements of the drawings are not necessarily shown at the same scale.

In the figures, elements, features and components which are identical and which have the same function and effect each have the same reference signs, unless otherwise stated.

DESCRIPTION OF EMBODIMENTS OF THE INVENTION

FIGS. 1-5 show a modular or multi-part track profile 1 for a profile light or a track lighting system according to an exemplary embodiment. The track profile 1 is connected to an outer base profile component 2 which is integrally extruded from a metal material, in particular an aluminium material, e.g. an aluminium alloy, and has a cross-section U-like basic shape, and two inner profile components 4 arranged in an inner area 3 of the outer base profile component 2. The inner profile components 4 each have an integral body 23 made by extrusion of a plastic material, wherein the body 23 houses a plurality of conductors 7 adapted to carry electric current for the operation of lighting devices or lighting modules and/or a control signal for the lighting devices or modules, for example a DALI signal or a signal based on another suitable protocol.

Figure 5:
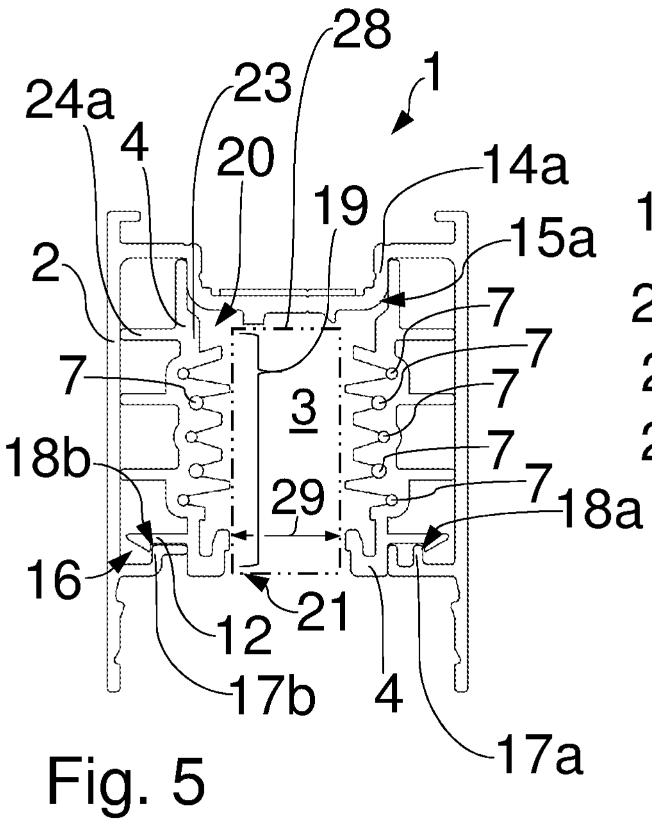
FIG. 5 the assembled track profile of FIG. 1 in a cross-sectional view.

The outer base profile component 2 and the inner profile components 4 are manufactured separately, wherein the outer base profile component 2 has a cross-section essentially constant along a longitudinal extension 5 thereof, and each of the inner profile components 4 also has a cross-section essentially constant along a longitudinal extension 6 of the inner profile component 4. In an advantageous implementation, the inner profile components 4 are each formed with a body 23 that can be produced by means of the same extrusion tool. For example, FIG. 5 shows that the inner profile components 4 are arranged in a mirror-symmetrical manner to one another after they have been connected to the base profile component 2.

Figure 4:
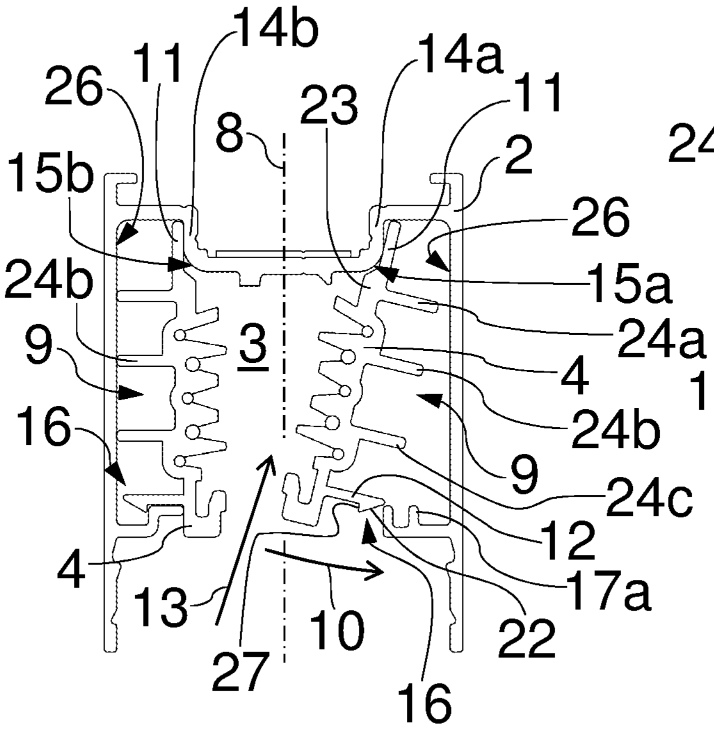
FIG. 4 the track profile of FIG. 1 during assembly in a second assembly step, in a cross-sectional view.

FIG. 4, for example, shows that on both sides of a longitudinal centre plane 8 of the outer base profile component 2, each of the base profile components 2 has a receiving area 9 in order to receive one of the inner profile components 4.

In the case of the track profile 1 according to the exemplary embodiment, the inner profile components 4 and the outer base profile component 2 can not only be manufactured separately, but can also be connected to one another in a particularly simple, cost-effective and expedient manner. Without unduly stringent requirements relating to the tolerances on the geometry and/or dimensions of the components 2 and 4, they can be connected to one another without binding or binding.

In the following, it is initially assumed that, as described above, the inner profile components 4 are embodied in the same way on both sides of the longitudinal centre plane 8, for example formed with two pieces of an extruded plastic profile body 23, cut to the length of the base profile component 2 and provided with conductors 7.

Figure 3:
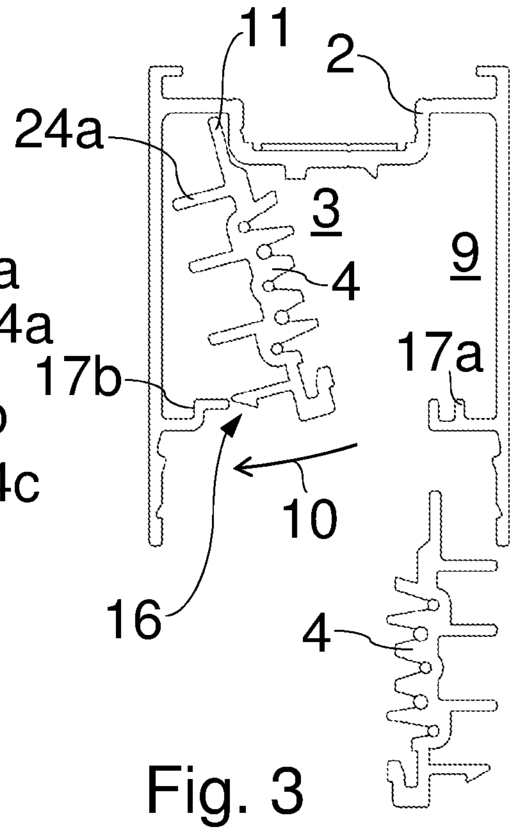
FIG. 3 the track profile of FIG. 1 during assembly in a first assembly step, in a cross-sectional view.

With reference to FIGS. 3-5, the inner profile component 4, seen in cross-section, has a central area 19 which is provided with a plurality of mutually parallel, outwardly widening grooves, at the base of which one of the conductors 7 mutually parallel to the component 4 is located. Furthermore, the inner profile component 4 has a plurality of sections 11, 12, 24*a*-24*c* designed as longitudinal ribs.

Specifically, the body 23 of the inner profile component 4 has a first longitudinal rib-like section 11 which extends essentially parallel to the longitudinal centre plane 8 when the inner profile component 4 is connected to the outer base profile component 2. The first section 11 extends away from a first end 20 of the central area 19 adjacent to a first end 20 thereof as an extension of a main extension surface of the latter. The second section 12 is embodied on the body 23 adjacent to a second end 21 of the central area 19, wherein the second end 21 is opposite the first end 20 of the central area 19 in the cross-section of the inner profile component 4. The first and second sections 11, 12 extend as longitudinal ribs of the body 23 transversely and perpendicularly to one another.

The further longitudinal ribs 24*a*, 24*b*, 24*c* extend outwards at the rear and thus on a side of the central area 19 which faces away from the side thereof from which the conductors 7 are accessible, essentially parallel to the second section 12 and to one another.

On the second, longitudinally rib-like section 12 of the inner profile component 4, an elastically movable latching device 16 is integrally formed with the section 12, which has a slide ramp 22 formed on the second section 12 and a retaining surface 27, for example, which is aligned essentially perpendicular to the section 12. The slide ramp 22 is arranged on the second section 12 facing away from the central area 19 and the first section 11. The sloping slide ramp 22 is inclined towards the main extension surface of the central area 19 and points outwards away from it.

In order to connect the inner profile components 4 to the outer base profile component 2 one after the other, and thus to assemble the track profile 1, the inner profile component 4 is first loosely inserted into the inner area 3, see in particular FIGS. 3-5. As the inner profile component 4—shown in FIG. 4 e.g. for the component 4 on the right side of the track profile 1, in FIG. 3 for those on the left side—is still movable with a lot of play in its loose state relative to the base profile component 2, it can be introduced without difficulty into the inner area 3, transverse to the longitudinal extension of the base profile component 2, through the space between the legs of the U-shape of the component 2.

For example, the outer base profile component 2 and the inner profile component 4 can be arranged approximately flush with one another at the front, even before the inner profile component 4 is introduced into the inner area 3. Then, roughly in the direction of the arrow 13, the first section 11 is inserted transversely to the longitudinal extension 5 behind a first undercut 14*a*, which is formed by a first rounded inner edge 15*a* of the outer base profile component 2, viewed from the longitudinal centre plane 8.

Alternatively, the inner profile component 4 can be loosely inserted into the inner area 3 from the end face of the base profile component 2, whereby it can be pushed in loosely due to the large amount of play and does not jam.

The inner profile component 4 is now (see for example in FIG. 4 on the right side) arranged with its longitudinal extension 6 parallel to the longitudinal extension 5 of the outer base profile component 2, wherein the first section 11 reach behind the inner edge 15*a*.

The undercut 14*a* and the edge 15*a* are formed on one of the two sides of an elevation provided in the middle area of the bottom of the U-like base profile component 2, on the section connecting the U-legs. A further first undercut 14*b* and a further first rounded inner edge 15*b* are provided on the other side of the elevation symmetrically to the undercut 14*a* and the edge 15*a*.

When the inner profile component 4 is pivoted about the first section 11, see reference signs 10 in FIG. 4, the latching device can be pushed back in an elastically resilient manner with the help of the slide ramp. After the pivoting is complete, the latching device 16 springs back and is brought into latching engagement with a second under-cut 17*a* and a second inner edge 18*a*, which are formed on one of two longitudinal ribs of the base profile component 2 projecting into the inner area 3. The movability of the latching device 16 is realized by means of the elasticity of the material of the body 23. A further second undercut 17*b* with a further second inner edge 18*b* is embodied at a point symmetrical to the undercut 17*a* and the edge 18*a* on the other of the longitudinal ribs projecting into the inner area 3.

This process is carried out for both inner profile components 4, wherein the profile component 4 pivots about the section 11 and the section 11 moves around the rounded inner edge 15 in each case. The components 2, 4 can thus be locked and connected with little friction. After latching, the inner profile component 4 is firmly mechanically connected to the outer base profile component 2. The process is carried out in the sequence shown in FIGS. 3 and 4, first for the profile component 4 on the left, then for that on the right, wherein it is possible for the sequence to be reversed.

The longitudinal rib-like section 24*a*, which is embodied essentially perpendicular to the first section 11 on the inner profile component 4 and is also arranged in the area of the first end 20 of the central area 19, has the effect that after the end of the pivoting process 10, the first section 11 rests securely against the undercut 14 embodied as a step. For this purpose, in the locked state, a free end of the section 24*a* in the receiving area 9 rests on a lateral inner surface 26 of the outer base profile component 2. This prevents the inner profile component 4 from becoming detached during use of the profile 1 when the first section 11 moves back.

The sections 24*b*-*c* also support the inner profile component 4 and in particular the central area 19.

In the assembled state of the track profile 1, in a cross-section thereof, see FIG. 5, an intermediate space is formed between the inner profile components 4 within the inner area 3, wherein the intermediate space is embodied with at least one rectangular free space 28 between the inner profile components 4. The rectangular free space 28 in the cross-section of the track profile 1, has a width 29 of between about 10 millimetres and about 20 millimetres, preferably between approximately 14 millimetres and approximately 16 millimetres, measured in the transverse direction of the track profile 1, normal to a depth direction thereof and normal to the longitudinal extensions 5, 6, as one of the side lengths of the free space 28.

Figure 6:
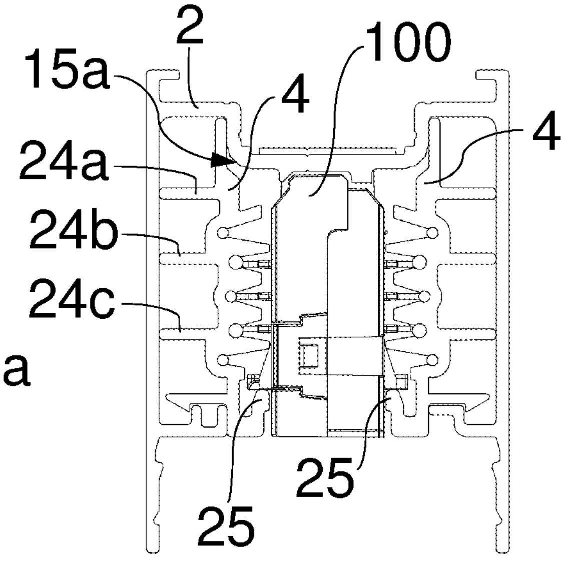
FIG. 6 the assembled track profile of FIG. 1 with an adapter arranged in an inner area thereof, in a cross-sectional view from an opposite viewing direction compared to FIGS. 3-5.

In the assembled state, the track profile 1 is set up to receive an adapter 100 of a profile light or a track lighting system. A received adapter 100 is shown by way of example in FIG. 6, wherein several of the conductors 7 come into contact with contacting devices of the adapter 100 designed for this purpose. The width 29 of the free space 28 is selected to accommodate the adapter 100.

Figure 7:
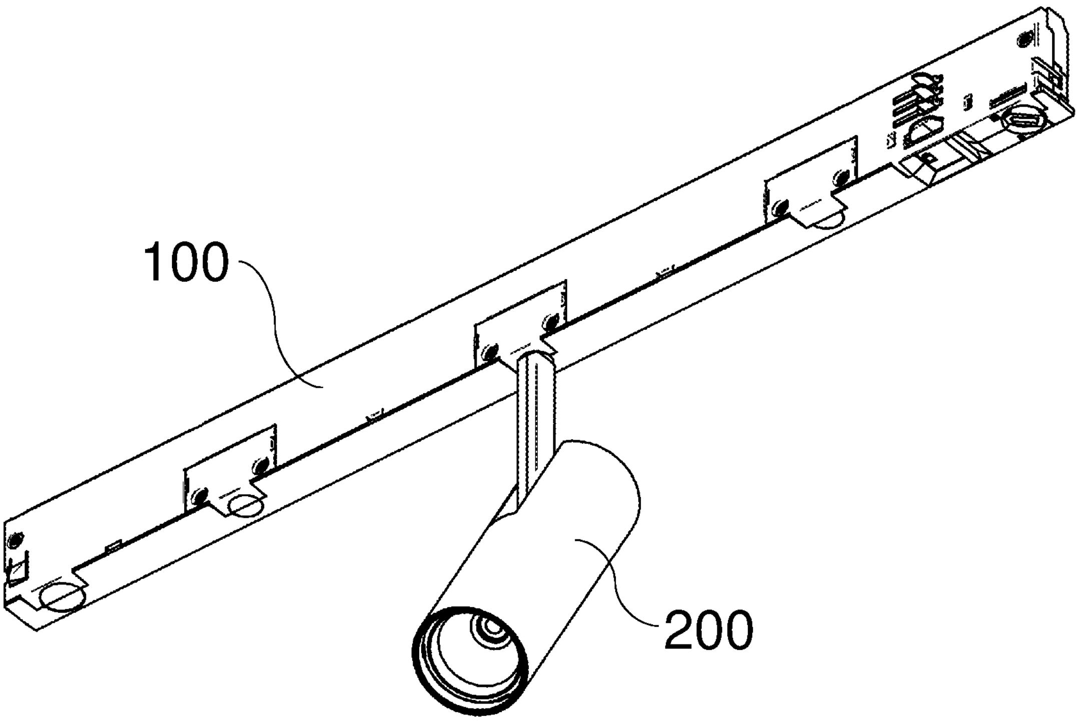
FIG. 7 an adapter and a lighting device coupled to the adapter for use in a track lighting system together with the track profile of FIGS. 1-6.

7 shows the adapter 100, which is coupled to a lighting device 200 by way of example. The connection of the lighting device 200 to the adapter 100 can be fixed, or the lighting device 200 can be detachably connected to the adapter 100. A lighting module or another suitable lighting device can take the place of the spotlight or linear lighting device 200 in FIG. 7.

On the side of the central area 19 where the conductors 7 are accessible and which faces the adapter 100 when this is inserted into the profile 1, each inner profile component 4 has a step 25 in the central area 19 which is arranged adjacent to the second section 12. The steps 25 of the two inner profile components 4 point towards one another when the track profile 1 is in the assembled state. For the mechanical coupling of the profile 1 with the adapter 100, or instead with a lighting module not shown in the figures, which could be provided with contact elements to create a connection with the conductors 7, the step 25 on either side of the adapter 100 or module can be grasped from behind by means of suitable engagement elements, in particular detachably, in order to hold the adapter 100 or the module on the track profile 1.

A modular profile 1 to accommodate the conductor tracks 7 and one or more adapters 100 of a profile light or a track lighting system is described above with reference to an exemplary embodiment. In the exemplary embodiment, the inner profile components 4 can be connected to the outer base profile component 2 with little effort, in a simple manner and without unnecessarily strict tolerances in terms of geometry and dimensions. This is achieved by dividing the profile 1 into several components 2, 4, which are manufactured separately and then connected simply and inexpensively—including the outer base profile 2 and two inner profile elements 4 which can be clipped into the outer base profile 2 on both sides—which accommodate further components such as the electrical conductors 7 permanently installed in the body 23. The adapter 100 can be detachably inserted and removed from the profile 1.

In the exemplary embodiment shown in the figure, each of the inner profile components 4 has five electrical conductors 7, whereby the figure shows a 10-pole track profile 1, for example for a track lighting system. In a variant, it can be provided, for example, that each of the inner profile components 4 is equipped with fewer conductors 7, for example three conductors 7 to form a 6-pole profile 1. Alternatively, a different number of conductors can be provided on each inner profile component 4. In addition, it is conceivable that the two inner profile elements 4 could be equipped with different numbers of conductors 7. It is thus also possible to equip the outer base profile component 2 in a mechanically identical way in a modular manner with different types of inner profile components 4.

The conductors 7 can include, for example, a neutral conductor and one or more phase conductors in order to provide an alternating electrical current, as well as signal conductors.

In further exemplary embodiments, provision can be made for the latching device 16 not to be formed in one piece with the body 23 of the inner profile component 4, but rather with one or more separate, additional and in particular movable components, which enable the inner profile component 4 to lock into place on the outer base profile component 2, wherein the movable component(s) can hereby be manufactured separately and connected to the body 23.

Figure 8:
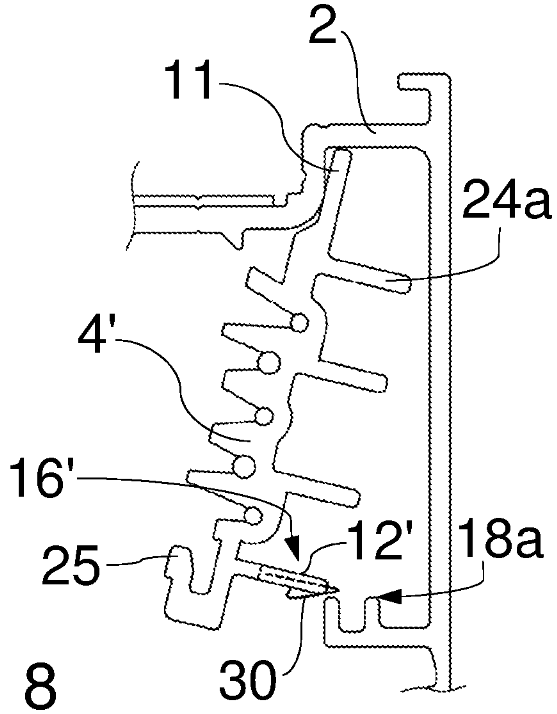
FIG. 8 a partial cross-sectional view of a track profile during an assembly step, according to an exemplary embodiment.

FIG. 8 outlines an exemplary embodiment in which a latching device 16' with an elastically movable spring 30 is embodied as a further component, for example made of a metal material. In particular, a large number of such springs 30 can be arranged along the longitudinal extension 6 on a second longitudinal rib-like section 12' of an inner profile component 4'. Section 12' differs from section 12 in FIGS. 1-6 in the alternative design of the free end of section 12' without the slide ramp 22, but has, for example, recesses to accommodate the springs 30. The spring 30 engages after pivoting 10 behind the edge 18*a* or 18*b*. In addition to FIG. 8, reference is made to the explanations for FIGS. 1-7.

In the preceding exemplary embodiments, it can be provided that the pivoting 10 takes place manually or by means of a device set up for this purpose.

Although the present invention has been fully described above with reference to the preferred exemplary embodiments, it is not limited to these exemplary embodiments and can be modified in a variety of other ways.

In particular, it is conceivable that the same or different inner profile components could be arranged on the base profile component and/or that more than two inner profile components could be provided.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 102022204266.2, filed Apr. 29, 2022, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

REFERENCE LIST

1 track profile
2 outer base profile component
3 inner area (base profile component)
4, 4' inner profile component
5 longitudinal extension (base profile component)
6 longitudinal extension (inner profile component)
7 conductor
8 longitudinal central plane (base profile component)
9 receiving area
10 pivoting movement
11 first longitudinal rib-like section
12, 12' second longitudinal rib-like section
13 direction transverse to the longitudinal extension 5
14*a*, 14*b* undercut
15*a*, 15*b* rounded inner edge
16, 16' latching device
17*a*, 17*b* undercut
18*a*, 18*b* inner edge
19 central area (inner profile component)
20 first end (central area)
21 second end (central area)
22 slide ramp (second section)
25 23 body
24*a*-24*c* further longitudinal rib-like sections
25 step
26 lateral inner surface
27 retaining surface
28 free space
29 side length (free space)
30 spring
100 adapter
200 lighting device

The invention claimed is:

1. A track profile for a profile light or for a track lighting system, having:

an outer base profile component having a cross-section U-like basic shape and an inner area; and at least one inner profile component;

wherein the outer base profile component and the inner profile component can be produced separately;

wherein the outer base profile component and the inner profile component are configured so that, in order to assemble the track profile, the inner profile component can be loosely inserted into the inner area and the inner profile component arranged loosely in the inner area along a longitudinal extension of the outer base profile component can subsequently be latched to the outer base profile component in order to mechanically connect the outer base profile component and the inner profile component together;

wherein the inner profile component and the outer base profile component are configured to be latched together by means of a pivoting movement of the inner profile component arranged loosely along the longitudinal extension of the outer base profile component in the inner area relative to the outer base profile component;

wherein the inner profile component has a first longitudinally rib-like section having a linear cross-section extending from a proximal end to a distal end, the distal end being insertable in a direction transversely to the longitudinal extension of the outer base profile component behind a first undercut or behind a first inner edge of the outer base profile component, viewed from a longitudinal center plane of the outer base profile component, wherein the first undercut and the first inner edge are formed on one of the two sides of an elevation provided on a section of the outer base profile component that connects the U-legs of the outer base profile component;

wherein the inner profile component has an elastically movable latching device which is provided on a second longitudinally rib-like section of the inner profile component and can be brought into latching engagement with a second undercut or a second inner edge of the outer base profile component;

wherein the latching of the inner profile component to the outer base profile component is brought about by pivoting the inner profile component around the first section; and wherein the first longitudinally rib-like section as a whole extends parallel to the longitudinal center plane of the outer base profile component when the inner profile component is connected to the outer base profile component.

2. The track profile according to claim 1, wherein the outer base profile component and the inner profile component each have a substantially constant cross-section along a longitudinal direction of the outer base profile component or the inner profile component.

3. The track profile according to claim 1, wherein the outer base profile component is produced using extrusion and/or wherein the inner profile component is produced using an extrusion process.

4. The track profile according to claim 1, wherein the track profile in the assembled state is configured to accommodate an adapter of the profile light or the track lighting system, wherein the adapter is configured to be or is coupled to a lighting device or a lighting module.

5. The track profile according to claim 1, wherein the inner profile component is configured to accommodate conductors or wherein conductors are provided in or on the inner profile component, wherein the conductors are embodied for the provision of electrical current for the operation of at least one lighting device or at least one lighting module and/or for the provision of a control signal.

6. The track profile according to claim 1, wherein the track profile has at least two inner profile components.

7. The track profile according to claim 6, wherein the two inner profile components are configured with the same geometry and to be produced using the same tool, and/or are connected to the outer base profile component in a mirror-symmetrical and latching manner.

8. The track profile according to claim 6, wherein the two inner profile components are arranged on different sides of the longitudinal center plane of the outer base profile component and/or wherein the outer base profile component, on both sides of the longitudinal center plane of the outer base profile component, has a receiving area to accommodate one of the inner profile components.

9. The track profile according to claim 1, wherein the first inner edge is formed as a rounded inner edge of the outer base profile component.

10. The track profile according to claim 1, wherein the latching device is formed in one piece with a body of the inner profile component.

11. The track profile according to claim 1, wherein the latching device is formed with at least one additional component arranged on a body of the inner profile component.

12. The track profile according to claim 1, wherein the inner profile component has a central area, seen in a cross-section thereof, which is configured to accommodate further parts or components or is equipped with such parts or components and/or which is configured for mechanical coupling to an adapter or module that can be inserted into the track profile, and wherein the first section and the second section are formed adjacent to opposite ends of the central area in the cross-section.

13. The track profile according to claim 12, wherein the second section is formed with a slide ramp which is located on the second section turned away from the central area and the first section.

14. The track profile according to claim 1, wherein the first and second sections are configured as longitudinal ribs on the inner profile component extending transversely to one another.

15. The track profile according to claim 1, wherein the outer base profile component is formed with a metal material and/or wherein the inner profile component is formed with a plastic material in at least some areas.

16. The track profile according to claim 1, wherein in the assembled state of the track profile in a cross-section thereof, there is at least one rectangular free space with a side length in a range of between approximately 10 millimetres and approximately 20 millimetres or between approximately 14 millimetres and approximately 16 millimetres.

17. The track profile according to claim 12, wherein the further parts or components are electrical conductors.

18. The track profile according to claim 1, wherein the first and second sections are configured as longitudinal ribs on the inner profile component extending substantially perpendicularly to one another.

19. The track profile according to claim 1, wherein the outer base profile component is formed with aluminium or an aluminium alloy and/or wherein the inner profile component is formed with a plastic material in at least some areas.

20. The track profile according to claim 1, wherein in the assembled state of the track profile in a cross-section thereof, there is at least one rectangular free space with a width having a range of between approximately 10 millimetres and approximately 20 millimetres or between approximately 14 millimetres and approximately 16 millimetres.

* * * * *